(12) United States Patent
Wang et al.

(10) Patent No.: US 9,693,283 B2
(45) Date of Patent: Jun. 27, 2017

(54) METHOD FOR MANAGING PERIODIC PACKETS, SERVER AND NETWORK EQUIPMENT

(71) Applicant: Industrial Technology Research Institute, Hsinchu (TW)

(72) Inventors: Jung-Chih Wang, Kaohsiung (TW); Chi-Chun Chen, Hsinchu (TW); Chin-Yuan Hsiao, Tainan (TW); Cheng-Lung Chu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 209 days.

(21) Appl. No.: 14/675,766

(22) Filed: Apr. 1, 2015

(65) Prior Publication Data

US 2016/0150553 A1 May 26, 2016

(30) Foreign Application Priority Data

Nov. 26, 2014 (TW) .............................. 103140962 A (51) Int. Cl.
*H04W 40/04* (2009.01)
*H04W 56/00* (2009.01)
*H04W 28/18* (2009.01)
*H04W 72/04* (2009.01)

(52) U.S. Cl.
CPC ........... *H04W 40/04* (2013.01); *H04W 28/18* (2013.01); *H04W 56/001* (2013.01); *H04W 72/042* (2013.01)

(58) Field of Classification Search
None
See application file for complete search history.

(56) References Cited

U.S. PATENT DOCUMENTS

| 8,189,592 | B2 | 5/2012 | Rabenko |
| 8,483,084 | B2 | 7/2013 | Eckley, IV et al. |
| 8,626,922 | B2 | 1/2014 | Short et al. |
| 2012/0014379 | A1 | 1/2012 | Dawson |
| 2012/0216238 | A1 | 8/2012 | Cristallo et al. |

(Continued)

FOREIGN PATENT DOCUMENTS

| CN | 101047428 | 10/2007 |
| CN | 101159652 | 9/2010 |

(Continued)

OTHER PUBLICATIONS

Fei et al., "Measurements on Delay and Hop-Count of the Internet", In IEEE GLOBECOM '98—Internet Mini Conference, Nov. 1998, pp. 1-8.

(Continued)

*Primary Examiner* — Anh Ngoc Nguyen
(74) *Attorney, Agent, or Firm* — Jianq Chyun IP Office (57) ABSTRACT

A method for managing periodic packets, a server and a network equipment are provided. The method includes the steps of receiving at least one transmission parameter of a plurality of periodic packets, determining at least one time sequence for rearranging and transmitting the periodic packets according to the at least one transmission parameter, transmitting the at least one time sequence, and receiving and disassembling the periodic packets already rearranged and transmitted according to the at least one time sequence.

36 Claims, 6 Drawing Sheets

(56) References Cited

U.S. PATENT DOCUMENTS

| | | | |
|---|---|---|---|
| 2013/0128729 A1 | 5/2013 | Nair et al. | |
| 2013/0308532 A1 | 11/2013 | Yu et al. | |
| 2014/0369310 A1* | 12/2014 | Chakraborty | H04W 72/044 370/330 |
| 2015/0009883 A1* | 1/2015 | Bai | H04L 5/0007 370/312 |

FOREIGN PATENT DOCUMENTS

| | | |
|---|---|---|
| CN | 102202386 | 9/2011 |
| CN | 102318268 | 1/2012 |
| CN | 103181104 | 6/2013 |
| TW | 200937974 | 9/2009 |
| TW | 201145906 | 12/2011 |
| TW | 201328250 | 7/2013 |

OTHER PUBLICATIONS

Lin et al., "Jetty improves the performance of network management system based on TR069 protocol", IEEE International Conference on Intelligent Computing and Intelligent Systems (ICIS), Oct. 2010, pp. 799-801.

Cruz et al., "CWMP extensions for enhanced management of domestic network services", IEEE Local Computer Networks (LCN), Oct. 2010, pp. 180-183.

Yang et al., "A light-weight periodic data collection approach of TR-069 managed CPEs", IEEE Network Operations and Management Symposium (APNOMS), Sep. 2012, pp. 1-7.

Yang et al., "Service rate test mechanism and management of broadband access network", IEEE Network Operations and Management Symposium (APNOMS), Sep. 2013, pp. 1-3.

Radovanovic et al., "Cloud-based framework for QoS monitoring and provisioning in consumer devices", IEEE Third International Conference on Digital Object Identifier, Sep. 2013, pp. 1-3.

* cited by examiner

METHOD FOR MANAGING PERIODIC PACKETS, SERVER AND NETWORK EQUIPMENT

CROSS-REFERENCE TO RELATED APPLICATION

This application claims the priority benefit of Taiwan application no. 103140962, filed on Nov. 26, 2014. The entirety of the above-mentioned patent application is hereby incorporated by reference herein and made a part of this specification.

TECHNICAL FIELD

The present disclosure relates to a method for managing periodic packets, a server and a network equipment.

BACKGROUND

A network is often used to connect electronic devices to a management server because when the electronic devices are located at a remote area, it is required to use the network in order to connect the devices with the management server for the purpose of management.

When there are more devices to be managed, costs for renting network bandwidth are bound to be increased. On the other hand, some management servers adopt a processing mechanism of first-in-first-out. Accordingly, if the devices to be managed are increased yet a capability of instantly processing emergency packets must be maintained, initial costs for configuring the server are bound to be increased.

In recent years, due to high awareness for energy saving, an energy management system (e.g., a solar power monitoring operation system) has become an important technical development around the globe. A solar power plant usually includes a great amount of devices of the same nature in order to generate a massive amount of electrical energy. Because these devices periodically report back to the management server, a great amount of dispersed periodic packets (e.g., packets regarding power-generating conditions or abnormal conditions) is generated accordingly.

SUMMARY

A method for managing periodic packets, a server and a network equipment are provided according to the embodiments of the present disclosure for solving said issue of increasing costs.

A method for managing periodic packets according to the embodiments of the present disclosure includes the following steps: at least one transmission parameter of a plurality of periodic packets is received; at least one time sequence for rearranging and transmitting the periodic packets is determined according to the transmission parameter; the time sequence is transmitted; and the periodic packets already rearranged and transmitted are received and disassembled according to the time sequence.

Another method for managing periodic packets according to the embodiments of the present disclosure includes the following steps: a time sequence is received, and the time sequence is determined according to at least one transmission parameter of a plurality of periodic packets; the periodic packets are received; and the periodic packets are rearranged and transmitted according to the time sequence.

A server according to the embodiments of the present disclosure includes a network interface and a processor coupled to the network interface. The network interface transmits and receives packets for the server. The processor receives at least one transmission parameter of a plurality of periodic packets, determines at least one time sequence for rearranging and transmitting the periodic packets according to the at least one transmission parameter, transmits the at least one time sequence, and receives and disassembles the periodic packets already rearranged and transmitted according to the at least one time sequence.

A network equipment according to the embodiments of the present disclosure includes a network interface and a processor coupled to the network interface. The network interface transmits and receives packets for the network equipment. The processor receives a time sequence determined according to at least one transmission parameter of a plurality of periodic packets, receives the periodic packets, and rearranges and transmits the periodic packets according to the time sequence.

Based on the above, the time sequence according to the embodiments of the present disclosure is capable of reasonably rearranging and setting a timing schedule for transmitting the periodic packets, and effectively utilizing the network bandwidth while reducing the processing loading of the server.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
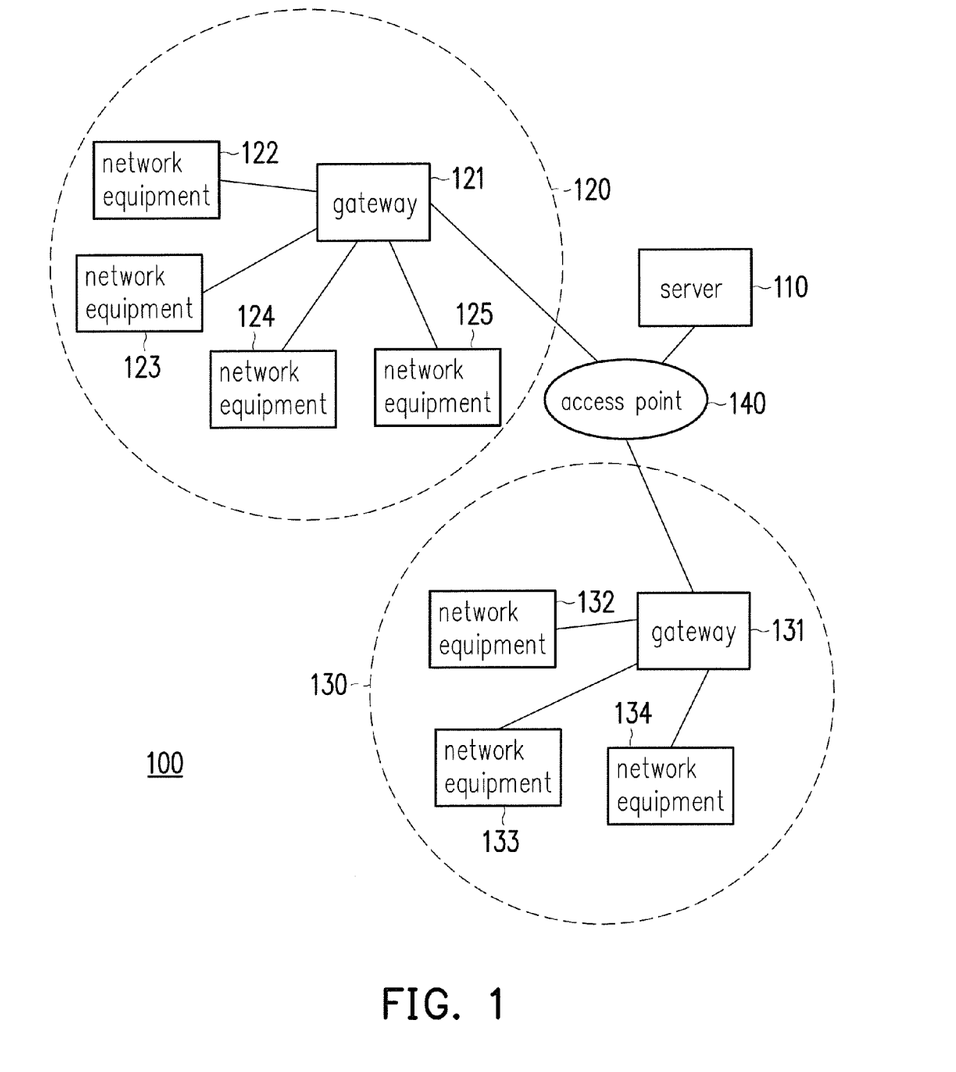
FIG. 1 is a schematic diagram of a network according to an embodiment of the present disclosure.

FIG. 1 is a schematic diagram of a network 100 according to an embodiment of the present disclosure. The network 100 may be a wired network or a wireless network. The network 100 includes a server 110, an access point 140, gateways 121 and 131, and network equipments 122 to 125 and 132 to 134. The gateway 121 and the network equipments 122 to 125 constitute a group 120. The gateway 131 and the network equipments 132 to 134 constitute a group 130. In fact, the gateways 121 and 131 also belong to the network equipments, which are selected by the server 110 as gateways for the groups 120 and 130 respectively. The access point 140 transmits packets between the server 110 and the group 120. The access point 140 also transmits packets between the server 110 and the group 130.

Each of the network equipments (including the gateways) may be connected to one or more backend devices which are not illustrated in FIG. 1. Each of the network equipments and each of the backend devices may transmit periodic packets to the server 110 through the corresponding gateway. According to a method for managing periodic packets of the present embodiment, each of the gateways may collect and rearrange the periodic packets from the group corresponding to the gateway, and transmit the rearranged periodic packets to the server 110 in order to enhance the efficiency of a transmission and a processing for the periodic packets.

The method for managing periodic packets of the present embodiment may be applicable to any network capable of containing a tree structure. For instance, the network 100 may be a network configured to manage a solar power plant. The server 110 may manage the network equipments and the backend devices of the network 100 through the CPE WAN management protocol (CWMP). Accordingly, the server 110 may be an auto configuration server (ACS). The network equipments 122 to 125 and 132 to 134 may be a customer premises equipment (CPE). The backend devices may be a power-generating device in the solar power plant.

In another embodiment, the server 110 may manage the network 100 by using any standard communication protocol for managing the network equipments, such as a management protocol established by open mobile alliance (OMA).

The network 100 of the present embodiment includes the two groups 120 and 130. Including the gateways, the group 120 includes five network equipments and the group 130 includes four network equipments. In another embodiment, the network 100 may include any number of groups, and each of the groups may include any number of the network equipments.

Figure 2:
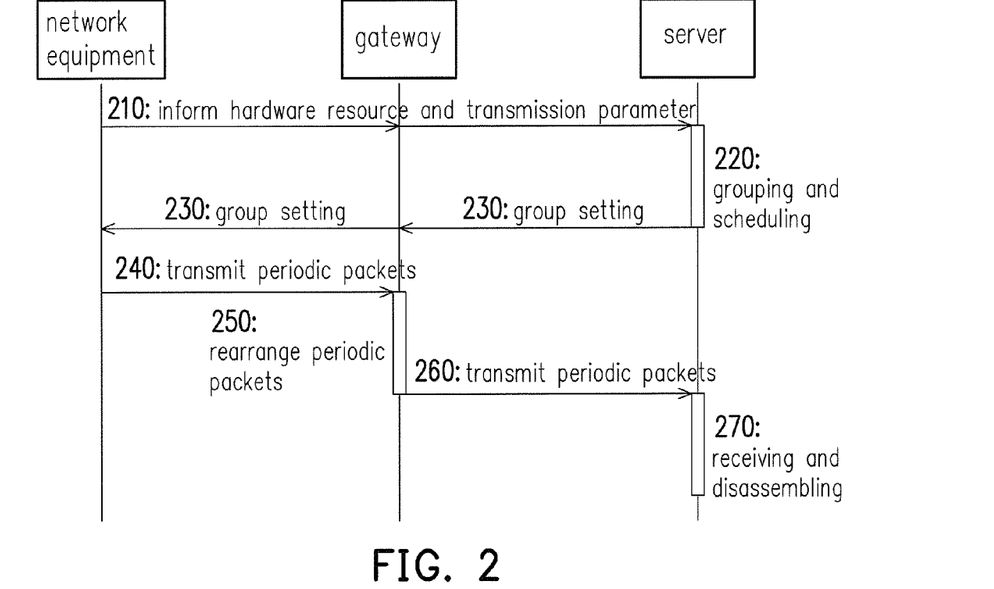
FIG. 2 is a flowchart of a method for managing periodic packets according to an embodiment of the present disclosure.

FIG. 2 is a flowchart of a method for managing periodic packets according to an embodiment of the present disclosure. The method for managing periodic packets may be executed by the server, the gateways and the network equipments in the network 100. At the beginning, the server 110 does not select the gateways from among the network equipments nor divide the network equipments into the groups yet. In step 210, each of the network equipments informs the server 110 of its hardware resource, and each of the network equipments also informs the server 110 of transmission parameters of the periodic packets to be uploaded. The gateways forward the information of hardware resources and transmission parameters from the network equipments to the server 110. The periodic packets are from the network equipment itself or the backend devices thereof. The transmission parameters of the periodic packets may include periods, the amount and priority levels of the periodic packets. In step 210, the server 110 receives the hardware resource data and the transmission parameters.

In step 220, the server 110 divides the network equipments into one or more groups according to an amount of hardware resources of the network equipments, and determines one time sequence for each group according to the transmission parameters of the periodic packets of each group. In brief, the one time sequence is configured to instruct the gateway of the corresponding group to rearrange and transmit the periodic packets of that group in order to enhance the efficiency of the transmission and the processing for the packets.

In step 230, the server 110 transmits settings of each group and the time sequence of each group for the gateway and the network equipments of each group to receive. In step 240, the network equipments upload the periodic packets, and the gateway of each group receives the periodic packets uploaded by the network equipments of the corresponding group. In step 250, the gateway of each group rearranges the periodic packets of the corresponding group according to the time sequence of the corresponding group.

More specifically, the time sequence of each group specifies a rule for merging the periodic packets of the group and setting a transmission order for the periodic packets of the group. A packet transmission period of the time sequence is divided into a plurality of time slots. The gateway may merge and arrange the periodic packets of the corresponding group in the time slots according to the rule of the time sequence. If the periodic packets are too many, the gateway may perform a package merging according to the periodic packets of the corresponding group and according to the rule of the time sequence in order to generate one or more combined packets, and then arrange the combined packets into the time slots of the time sequence. Because the combined packets are generated by merging the periodic packets, each of the combined packets includes payload data of at least two of the periodic packets.

After the packets are rearranged, in step 260, the gateway of each group uploads the periodic packets of the corresponding group according to the order of the periodic packets in the time slots of the time sequence of the corresponding group for the server 110 to receive. In step 270, the server 110 receives the packets uploaded by the gateway of each group, and disassembles the combined packets therein to restore the merged periodic packets. The server 110 may analyze a content of each periodic packet in order to perform a corresponding process.

Next, steps 240 to 270 may be executed repeatedly. The server 110 is also capable of instantly analyzing a real period of the received periodic packets and monitoring online/offline statuses of the network equipments. When the transmission parameters of the periodic packets does not match to the real situation or when the transmission parameters change or when the network 100 adds or removes network equipment, the server 110 may execute steps 220 and 230 repeatedly for rearranging the groups, reselecting the gateways, redetermining the time sequence of each group, and retransmitting the settings and the time sequences of the groups. Accordingly, the groups and the time sequences may be dynamically adjusted in response to the variations in the network environment.

While executing the processes of FIG. 2, the server, the gateways, and the network equipments in the network 100 may perform time synchronization according to a standard protocol such as the Network Time Protocol (NTP) or IEEE1588. As such, the server 110 is capable of punctually setting the time sequence of each group, such that each gateway may punctually transmit the periodic packets of the corresponding group according to the time sequence of the corresponding group.

Details regarding how to divide all the network equipments into one or more groups by the server 110 in step 220 are described as follows. For simplicity, it is assumed that the total number of network equipments in the network 100 is $G_{total}$, each of the network equipments has the same hardware resource (i.e., each gateway has the same hardware resource), and each gateway has N types of the hardware sources, where N is any positive integer. The types of the hardware resources may include computing capability, memory capacity and the like. The server 110 may calculate an equipment amount $G_{max}$ as a maximum amount of the network equipments that can be contained by each group by using a formula (1) listed below.

$$G_{max} = \sqrt{\frac{\sum_{i=1}^{N}\left(\frac{R_i}{C_i}\right)^2}{N}} \quad (1)$$

In the formula (1), $R_i$ is an amount of an $i^{th}$ hardware resource of the gateway. For each gateway, $C_i$ is a cost amount of the $i^{th}$ hardware resources required for processing the periodic packets of one network equipment. By using a formula (2), the server 110 may divide the total amount $G_{total}$ of the network equipments in the network 100 by the equipment amount $G_{max}$ in order to obtain a group amount $G_{size}$.

$$G_{size} = \frac{G_{total}}{G_{max}} \quad (2)$$

If the network 100 uses a wireless network, the network 100 may include one access point, and the network equipments may be connected to the server 110 through the access point. The server 110 may sort the network equipments according to a distance $R_{gtime}$ between each of the network equipments and the access point, and a $G_{size}$ number of the network equipments are selected from small to large to serve as a $G_{size}$ number of the gateways of the network 100. Each of the gateways is corresponding to one group. $R_{gtime}$ is a response time for a connection between one network equipment and the access point.

Then, according to a distance $R_{dtime}$ between each of the network equipment and each of the gateways, for each of the network equipments, the sever 110 may add the network equipment into a group $G_{group}$ corresponding to the gateway having the smallest distance $R_{dtime}$ corresponding to the network equipment among the groups whose amounts of the contained network equipments are less than the equipment amount $G_{max}$. If the amount of the contained network equipments of a group reaches $G_{max}$, no more network equipments can be added to that group. $R_{dtime}$ is a response time for a connection between one network equipment and the gateway.

Figure 3:
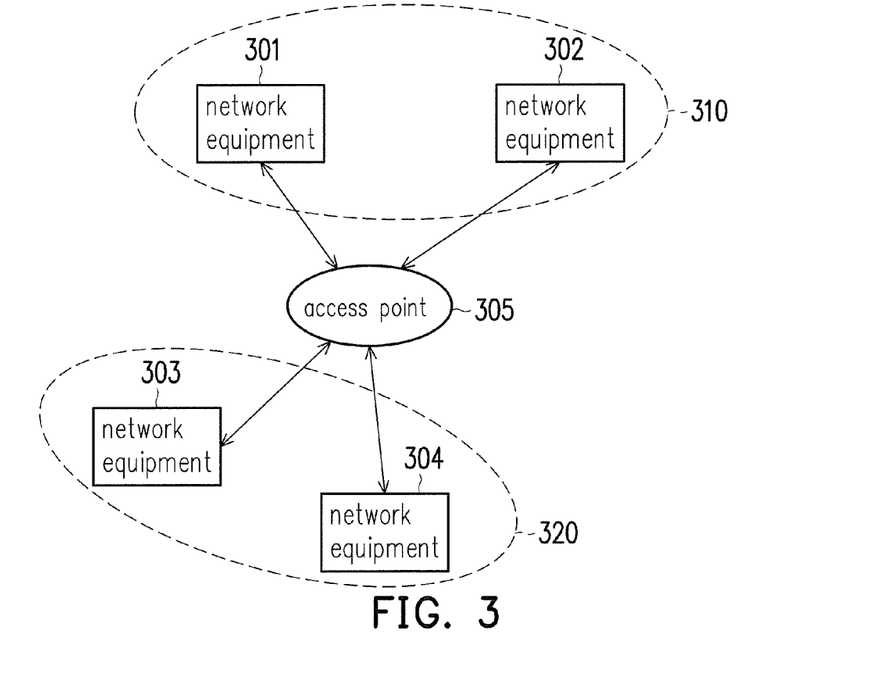
FIG. 3 is a schematic diagram of the group division in the method for managing periodic packets according to an embodiment of the present disclosure.

FIG. 3 is a schematic diagram for describing aforesaid group division according to an embodiment of the present disclosure. A network of this embodiment includes four network equipments 301 to 304. Herein, it is assumed that the equipment amount $G_{max}$ and the group amount $G_{size}$ calculated by the server are both 2. When a size relation of the distances $R_{gtime}$ of the four network equipments 301 to 304 with respect to an access point 305 is $R_{301,305} < R_{303,305} < R_{302,305} < R_{304,305}$, $R_{301,305}$ is corresponding to the response time for a connection between the network equipment 301 and the access point 305, and the rest may be deduced by analogy. Therefore, the server selects the network equipment 301 to serve as a gateway of a group 310, and selects the network equipment 303 to serve as a gateway of another group 320. Then, the server compares the distance $R_{dtime}$ between each of the network equipments and each of the gateways. $R_{302,301}$ is also corresponding to the response time for a connection between the network equipment 302 and the gateway 301, and the rest may be deduced by analogy. The distance $R_{302,301}$ between the network equipment 302 and the gateway 301 is less than the distance $R_{302,303}$ between the network equipment 302 and the gateway 303, and thus the server adds the network equipment 302 into the group 310. The distance $R_{304,303}$ between the network equipment 304 and the gateway 303 is less than the distance $R_{304,301}$ between the network equipment 304 and the gateway 301, and thus the server adds the network equipment 304 into the group 320.

Details regarding how to determine the time sequence for rearranging and transmitting the periodic packets by the server 110 are described below with reference to FIG. 4, FIG. 5 and FIG. 6. Because the server 110 uses the same procedure to determine the time sequence for each group in the network 100, the following description is provided by using one specific group in the network 100 as an example.

Figure 4:
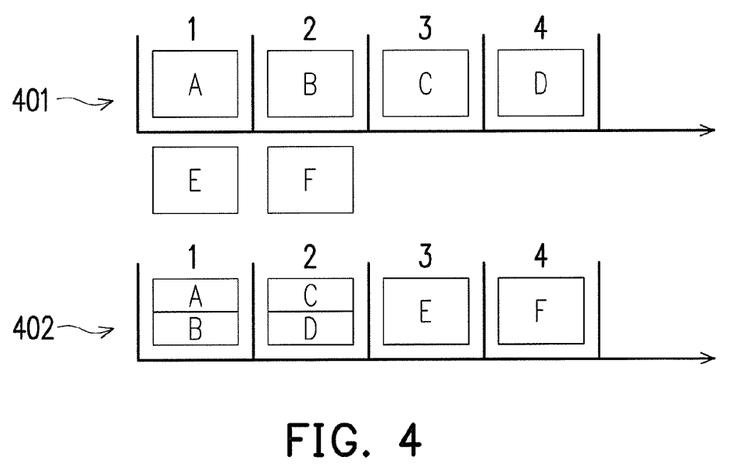
FIG. 4 is a schematic diagram of the time sequence in the method for managing periodic packets according to an embodiment of the present disclosure.

FIG. 4 is a schematic diagram of the time sequence in the method for managing periodic packets according to an embodiment of the present disclosure. In this embodiment, a specific group $G_{group}$ includes six periodic packets A, B, C, D, E, and F with different priority levels. An order of the priority levels of the six packets is A>B>C>D>E>F. A period of the six packets is transmitting once per four time slots. Therefore, four time slots 1 to 4 are provided in the time sequence of FIG. 4, a length of each of the time slots refers to a time required for the server 110 to process one periodic packet.

The server 110 groups the periodic packets A to F into a packet set $P_{n4,l1}\{A,B,C,D,E,F\}$, in which a number following n represents the period of the packets in the packet set (i.e., n4 represents that the period of the packets in this set is four time slots), and a number following l represents an amount of the packets in each combined packet in this set (i.e., l1 represents that one packet is included in each combined packet in this set).

Next, the server 110 calculates a merge count M according to the period of the periodic packets A to F and an amount of the time slots. More specifically, the server 110 attempts to arrange the periodic packets A to F into the time slots 1 to 4 under an assumption that each of the time slots is capable of containing one of the periodic packets. Under such assumption, four packets A to D can be arranged into the time slots 1 to 4, whereas packets E and F cannot be arranged into the time slots 1 to 4, as shown by a time sequence 401. A definition of the merge count M refers to an amount of the periodic packets unable to be arranged into the time slots under such assumption, and therefore the merge count M in the present embodiment is equal to 2.

Next, the server 110 performs a two-packet merging for M times according to the periodic packets A to F to generate one or more combined packets. Each time in the merging, each packet merged may be one of the periodic packets A to F, or the combined packet generated in the previous merging. Each time the merging first merges the packets that went through the fewest times of the merging, (i.e., the packets in the packet set having the smallest l values are merged first), and the packets being merged have the same period (i.e., the n value must be identical). Therefore, each of the at least one combined packet includes payload data of at least two of the periodic packets A to F.

At the time, there is one packet set $P_{n4,l1}\{A,B,C,D,E,F\}$, and the merge count M of the present embodiment is equal to 2, in which the first-time merging merges the packets A and B to generate a combined packet AB and the second-time merging merges the packets C and D to generate a combined packet CD. Aforesaid merging forms the following two packet sets:
$P_{n4,l2}\{AB,CD\}$
$P_{n4,l1}\{E,F\}$ $P_{n4,l2}\{AB,CD\}$ includes the two combined packets generated by aforesaid merging. $P_{n4,l1}\{E,F\}$ includes the packets not merged among the periodic packets A to F. The server 110 performs an average distribution and a sorting of the packets in the packet sets $P_{n4,l2}\{AB,CD\}$ and $P_{n4,l1}\{E,F\}$ according to the priority levels of the periodic packets A to F in the time slots 1 to 4, and a result thereof is as shown by a time sequence 402.

The time sequence 402 includes the merging rule and the transmission order for the periodic packets A to F. The server 110 transmits the time sequence 402 to the gateway of the corresponding group in step 230. The gateway receives the periodic packets A to F in step 240, and then rearranges and transmits the periodic packets A to F according to the time sequence 402 in steps 250 and 260.

Figure 5:
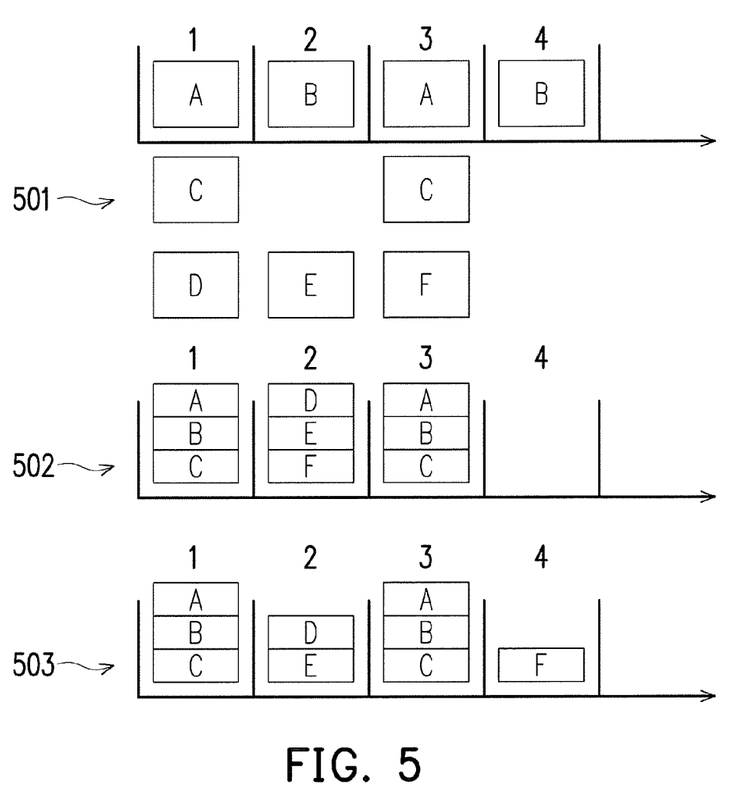
FIG. 5 is a schematic diagram of the time sequence in the method for managing periodic packets according to another embodiment of the present disclosure.

FIG. 5 is a schematic diagram of the time sequence in the method for managing periodic packets according to another embodiment of the present disclosure. In this embodiment, a specific group has six periodic packets A, B, C, D, E, and F with different priority levels. An order of the priority levels of the six packets is A>B>C>D>E>F. The period of the packets A, B and C is transmitting once per two time slots, and the period of the packets D, E, and F is transmitting once per four time slots. The server 110 calculates a least common multiple of the periods of the periodic packets A to F (i.e., four time slots) to serve as a transmission period of the time sequence of the present embodiment. Each transmission period is divided into the four time slots 1 to 4. The server 110 adds the periodic packets A to F into the following packet sets:
$P_{n2,l1}\{A,B,C\}$
$P_{n4,l1}\{D,E,F\}$ Next, the server 110 calculates the merge count M. The server 110 arranges the periodic packets A to F into the time slots 1 to 4 under an assumption that each of the time slots is capable of containing one of the periodic packets. The period of the packets A, B and C includes two time slots (i.e., transmitting once per two time slots). Accordingly, two packets A and B can be arranged into the time slots 1 to 4, whereas the remaining four packets cannot be arranged into the time slots 1 to 4, as shown by a time sequence 501. Therefore, the merge count M of the present embodiment is equal to 4.

Next, the server 110 performs a packet merging for a M number of times on the periodic packets A to F to generate one or more combined packets. As described in the previous embodiment, each merging first merges the packets that went through the fewest times of the merging, (i.e., the packets in the packet set having the smallest l value are merged first), and each of the packets being merged have the same period (i.e., the n value must be identical). The packet merging of the present embodiment includes two stages in which the first stage includes performing the merging for two times in the existing packet sets $P_{n2,l1}\{A,B,C\}$ and $P_{n4,l1}\{D,E,F\}$ to form the following four packet sets:
$P_{n2,l2}\{AB\}$
$P_{n2,l1}\{C\}$
$P_{n4,l2}\{DE\}$
$P_{n4,l1}\{F\}$ The second stage includes performing the merging in the four packet sets for two times to form the following two packet sets:
$P_{n2,l3}\{ABC\}$
$P_{n4,l3}\{DEF\}$ As a final result of the merging, two combined packets ABC and DEF are generated. The combined packet ABC includes the payload data of the periodic packets A, B and C, and the combined packet DEF includes the payload data of the periodic packets D, E and F. The server 110 arranges the two combined packets into the time slots 1 to 4 to generate a time sequence 502. The combined packet ABC is arranged into the time slots 1 and 3, and the combined packet DEF is arranged into the time slot 2. Because the period of the combined packet ABC has two time slots, two of the time slots in the time sequence are occupied. Because the combined packet ABC has the higher priority level, the server 110 sets the combined packet ABC in front of the combined packet DEF.

The time slot 4 of the time sequence 502 is empty. In order to utilize the empty time slot, the server 110 may disassemble the combined packet, and arrange a sub packet generated by disassembling the combined packet into the empty time slot to average out the transmission loading. Among all the combined packets, the server 110 disassembles the combined packet having the period greater than or equal to the period of the empty time slot to generate the sub packet. Further, the server 110 disassembles the combined packets in a descending order of the times of the merging that each combined packet went through to generate the sub packet. In other words, the server 110 disassembles the combined packets in a descending order of the l values of the packet set to generate the sub packet. In the example of the time sequence 502, the server 110 selects the combined packet DEF to be disassembled into sub packets DE and F, and arranges the sub packet F into the empty time slot 4, as shown by a time sequence 503. The server 110 transmits the time sequence 503 to the corresponding gateway.

Figure 6:
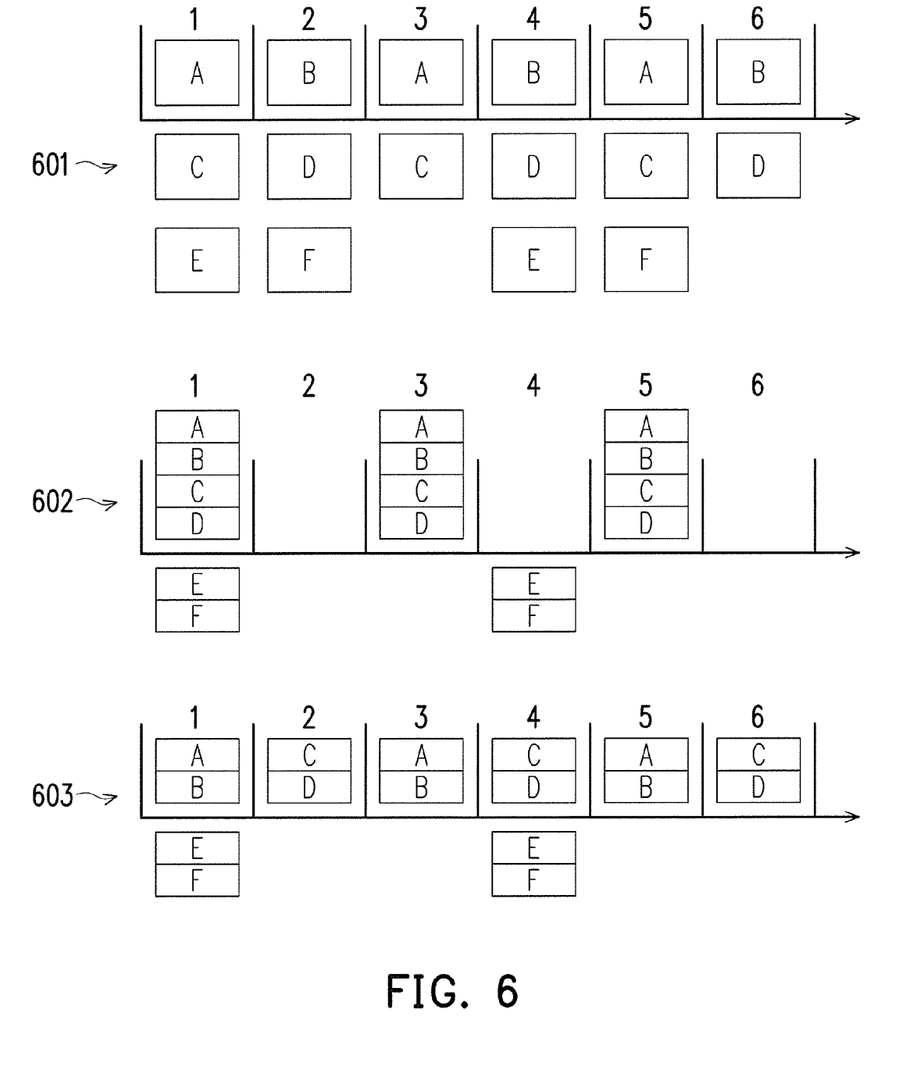
FIG. 6 is a schematic diagram of the time sequence in the method for managing periodic packets according to another embodiment of the present disclosure.

FIG. 6 is a schematic diagram of the time sequence in the method for managing periodic packets according to another embodiment of the present disclosure. In this embodiment, a specific group has six periodic packets A, B, C, D, E, and F with different priority levels. An order of the priority levels of the six packets is A>B>C>D>E>F. The period of the packets A, B, C and D is transmitting once per two time slots, and the period of the packets E and F is transmitting once per three time slots. The server 110 calculates a least common multiple of the periods of the periodic packets A to F (i.e., six time slots) to serve as a transmission period of the time sequence of the present embodiment. Each transmission period is divided into the six time slots 1 to 6. The server 110 adds the periodic packets A to F into the following packet sets:
$P_{n2,l1}\{A,B,C,D\}$
$P_{n3,l1}\{E,F\}$ Then, the server 110 calculates the merge count M. The server 110 arranges the periodic packets A to F into the time slots 1 to 6 under an assumption that each of the time slots is capable of containing one of the periodic packets. As shown by a time sequence 601, the packets C to F cannot be arranged into the time slots. Therefore, the merge count M of the present embodiment is equal to 4.

Next, the server 110 performs a packet merging for a M number of times on the periodic packets A to F. The packet merging of the present embodiment includes two stages in which the first stage includes performing the merging for three times in the existing packet sets $P_{n2,l1}\{A,B,C,D\}$ and $P_{n3,l1}\{E,F\}$ to form the following two packet sets:
$P_{n2,l2}\{AB,CD\}$
$P_{n3,l2}\{EF\}$ The second stage includes performing the merging once again to form the following two packet sets:
$P_{n2,l4}\{ABCD\}$
$P_{n3,l2}\{EF\}$ Then, the server 110 sets these packets to the time slots 1 to 6 according to the period and the priority levels, as shown by a time sequence 602.

Because the time sequences 602 includes an empty time slot, the server 110 may disassemble the combined packet in order to average out the transmission loading. The server 110 selects the combined packet ABCD having the period of 2 to be disassembled into sub packets AB and CD, and arranges the sub packet CD into the time slots 2, 4 and 6, as shown by a time sequence 603. The server 110 transmits the time sequence 603 to the corresponding gateway.

Figure 7:
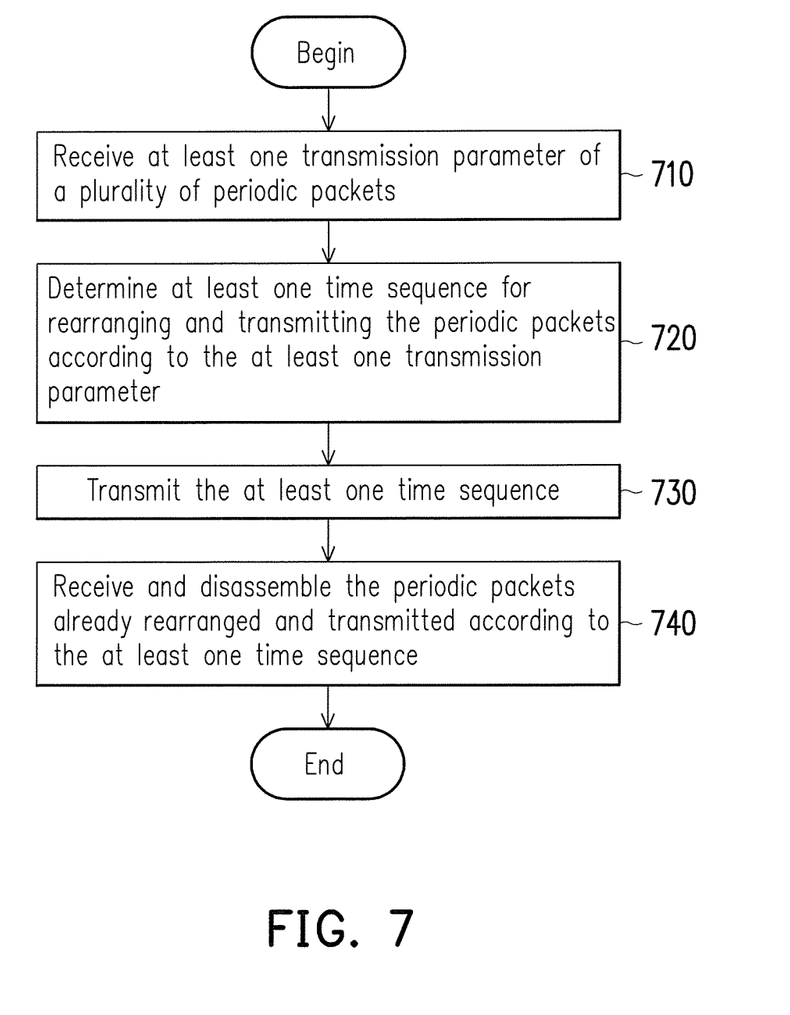
FIG. 7 is a flowchart of a method for managing periodic packets according to an embodiment of the present disclosure.

FIG. 7 is a flowchart of a method for managing periodic packets executed by the server 110 according to an embodiment of the present disclosure. In step 710, receive at least one transmission parameter of a plurality of periodic packets. In step 720, determine at least one time sequence for rearranging and transmitting the periodic packets according to the at least one transmission parameter. In step 730, transmit the at least one time sequence. In step 740, receive and disassemble the periodic packets already rearranged and transmitted according to the at least one time sequence. Related details of the steps are already disclosed in the previous embodiments. Therefore, those details are not repeated here.

Figure 8:
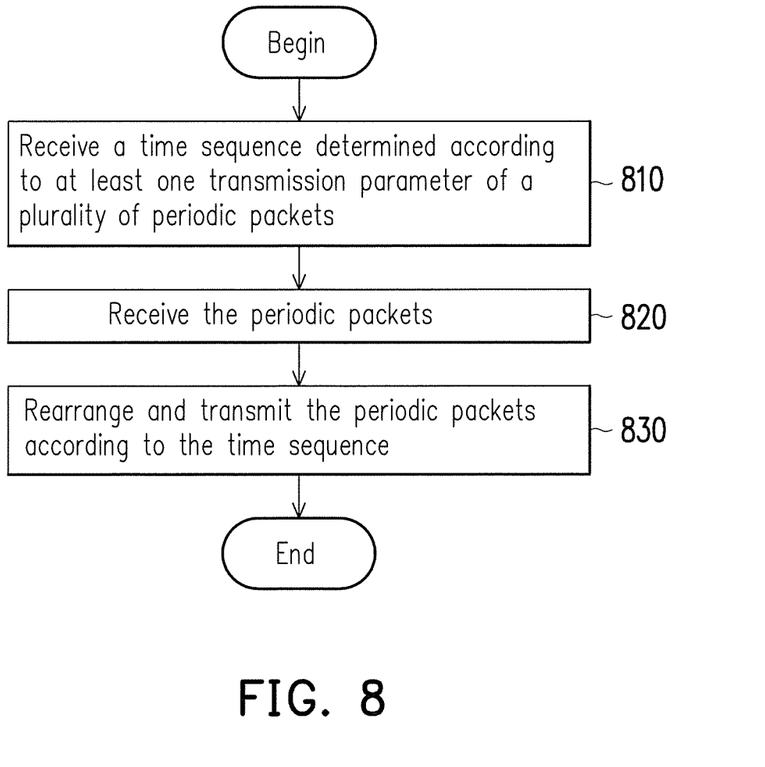
FIG. 8 is a flowchart of a method for managing periodic packets according to another embodiment of the present disclosure.

FIG. 8 is a flowchart of a method for managing periodic packets executed by each gateway (such as the gateway 121 or the gateway 131) according to an embodiment of the present disclosure. In step 810, receive a time sequence. The time sequence is determined according to at least one transmission parameter of a plurality of periodic packets. In step 820, receive the periodic packets. In step 830, rearrange and transmit the periodic packets according to the time sequence. Related details of the steps are already disclosed in the previous embodiments. Therefore, those details are not repeated here.

Figure 9:
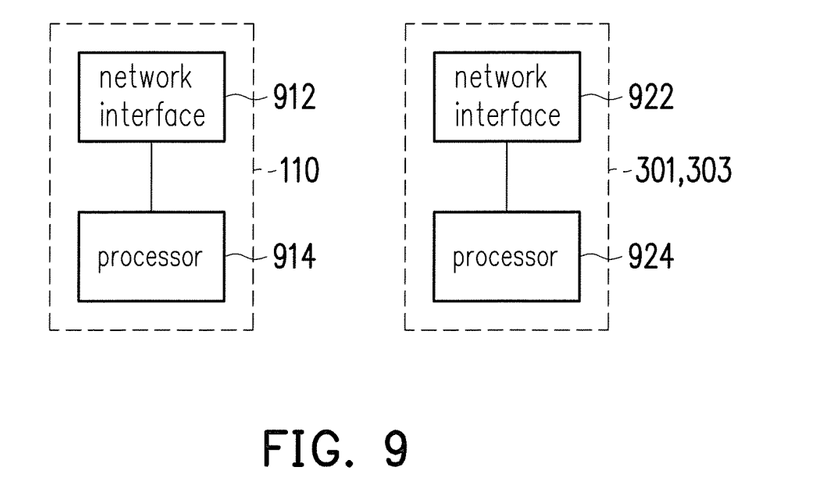
FIG. 9 is a schematic diagram of a server and a network equipment according to an embodiment of the present disclosure.

FIG. 9 is a schematic diagram of the server 110 and the network equipments 301 and 303 according to an embodiment of the present disclosure. The server 110 selects the network equipments 301 and 303 to serve as the gateways. The server 110 includes a network interface 912 and a processor 914 coupled to the network interface 912. The server 110 is coupled to the other parts of the network 100 through the network interface 912. The network interface 912 transmits and receives packets for the server 110. The processor 914 can execute the method for managing periodic packets as shown in FIG. 7.

The network equipment 301 (i.e., the gateway) includes a network interface 922 and a processor 924 coupled to the network interface 922. The network equipment 301 is coupled to the other parts of the network 100 through the network interface 922. The network interface 922 transmits and receives packets for the network equipment 301. The processor 924 can execute the method for managing periodic packets as shown in FIG. 8. The internal components of the network equipment 303 are the same as those of the network equipment 301.

The time sequence according to the foregoing embodiments is capable of serializing a transmitting time of the periodic packets, so as to balance and stabilize overall transmission of the network for reducing a peak flow of the packets. Accordingly, instantaneous transmission and processing loadings of the server may both be reduced, such that the server can maintain the capability of instantly processing the emergency packets. The combined packet according to the foregoing embodiments is capable of merging a plurality of periodic packets, so as to reduce the overall transmitting amount of the packets and improve a usage rate of the overall bandwidth. Under the same environmental and condition, the method for managing periodic packets according to the foregoing embodiments is capable of increasing the amount of the network equipments to be managed, so as to improve an overall performance for network management.

It will be apparent to those skilled in the art that various modifications and variations can be made to the disclosed embodiments. It is intended that the specification and examples be considered as exemplary only, with a true scope of the disclosure being indicated by the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

The invention claimed is:

1. A method for managing periodic packets in a network, wherein the network comprises at least one access point, at least one network equipment, and a server, wherein the at least one network equipment is connected to the server through the at least one access point, and wherein the method for managing periodic packets comprises:
receiving at least one transmission parameter of a plurality of periodic packets by the server from the at least one network equipment;
determining at least one time sequence for rearranging and transmitting the periodic packets according to the at least one transmission parameter by the server;
transmitting the at least one time sequence to the at least one network equipment by the server;
receiving the periodic packets already rearranged and transmitted according to the at least one time sequence by the server from the at least one network equipment, wherein the periodic packets are already merged according to the at least one time sequence to generate at least one combined packet, each of the at least one combined packet comprises payload data of multiple said periodic packets; and
disassembling the at least one combined packet to restore the merged periodic packets by the server.

2. The method for managing periodic packets of claim 1 further comprises:
calculating an equipment amount Gmax and a group amount Gsize by the server according to a device total and a hardware resource of the at least one network equipment;

selecting a Gsize number of the at least one network equipment by the server according to a first distance between each of the at least one network equipment and each of the at least one access point to serve as a Gsize number of gateways of the network, wherein each of the gateways is corresponding to a group; and adding each of the at least one network equipment into the group corresponding to one of the gateways by the server according to a second distance between each of the at least one network equipment and each of the gateways, wherein the gateways receive the at least one time sequence and rearrange and transmit the periodic packets according to the at least one time sequence.

3. The method for managing periodic packets of claim 2, further comprising:

sorting the at least one network equipments according to the first distance, and selecting the Gsize number of the network equipments having the smallest first distance to serve as the Gsize number of the gateways by the server; and for each of the at least one network equipment, adding the network equipment into the group corresponding to the gateway having the smallest second distance to the network equipment among the groups whose amounts of the contained network equipments are less than Gmax by the server.

4. The method for managing periodic packets of claim 2, further comprising:

when the at least one transmission parameter changes or when the network adds or removes network equipment, reselecting the gateways, rearranging the groups, redetermining the at least one time sequence, and retransmitting the at least one time sequence to the at least one network equipment by the server.

5. The method for managing periodic packets of claim 1, further comprising:

performing time synchronization with the at least one network equipment by the server to punctually set the at least one time sequence.

6. The method for managing periodic packets of claim 1, wherein the at least one transmission parameter comprises periods, an amount and priority levels of the periodic packets.

7. The method for managing periodic packets of claim 6, wherein the step of determining each of the at least one time sequence by the server comprises:

calculating a least common multiple of the periods of the periodic packets to serve as a transmission period of the time sequence by the server;

dividing the transmission period into a plurality of time slots by the server; and in the time slots, performing an average distribution and a sorting of the periodic packets by the server, wherein the sorting is performed according to the priority levels of the periodic packets.

8. The method for managing periodic packets of claim 7, wherein the step of determining each of at least one time sequence further comprises:

in the time slots, performing an average distribution and a sorting of the at least one combined packet and the periodic packets not merged by the server, wherein the sorting is performed according to the priority levels of the periodic packets; and if an empty time slot still exists in the time sequence after the average distribution and the sorting are performed, disassembling the at least one combined packet, and arranging a sub packet generated by disassembling the at least one combined packet into the empty time slot by the server.

9. The method for managing periodic packets of claim 8, wherein the step of performing the merging according to the periodic packets comprises:

calculating a merge count M by the server according to the periods of the periodic packets and an amount of the time slots; and performing a two-packet merging for M times by the server according to the periodic packets to generate the at least one combined packet, wherein each packet merged in each said merging is one of the periodic packets or the combined packet generated in the previous merging.

10. The method for managing periodic packets of claim 9, wherein the merge count M is an amount of the periodic packets unable to be arranged into the time slots under an assumption that each of the time slots is capable of containing one of the periodic packets.

11. The method for managing periodic packets of claim 9, wherein each said merging first merges the packets that went through fewest times of the merging, and the packets being merged have the same period.

12. The method for managing periodic packets of claim 8, wherein the step of disassembling the at least one combined packet by the server comprises:

among the at least one combined packet, disassembling the combined packet having the period greater than or equal to a period of the empty time slot by the server to generate the sub packet.

13. The method for managing periodic packets of claim 8, wherein the step of disassembling the at least one combined packet comprises:

disassembling the at least one combined packet in a descending order of times of the merging that each said combined packet went through by the server to generate the sub packet.

14. A method for managing periodic packets in a network, wherein the network comprises at least one access point, a gateway, at least one network equipment, and a server, wherein the at least one network equipment is connected to the server through the at least one access point, and wherein the method for managing periodic packets comprises:

receiving a time sequence by the gateway from the server, wherein the time sequence is determined according to at least one transmission parameter of a plurality of periodic packets;

receiving the periodic packets by the gateway from the at least one network equipment;

rearranging and transmitting the periodic packets to the server by the gateway according to the time sequence, wherein the periodic packets are already merged according to the at least one time sequence to generate at least one combined packet, each of the at least one combined packet comprises payload data of multiple said periodic packets; and disassembling the at least one combined packet to restore the merged periodic packets by the server.

15. The method for managing periodic packets of claim 14, wherein the at least one transmission parameter comprises periods, an amount and priority levels of the periodic packets.

16. The method for managing periodic packets of claim 14, wherein the step of rearranging and transmitting the periodic packets to the server by the gateway comprises:

merging and arranging the periodic packets in a plurality of time slots of the time sequence by the gateway according to a rule of the time sequence; and transmitting the periodic packets to the server by the gateway according to an order of the periodic packets in the time slots.

17. The method for managing periodic packets of claim 16, further comprising:

performing a merging according to the periodic packets and the rule of the time sequence to generate the at least one combined packet, and arranging the at least one combined packet into the time slots by the gateway.

18. The method for managing periodic packets of claim 14, further comprises:

performing time synchronization with the at least one network equipment and the server by the gateway in order to punctually transmit the periodic packets according to the time sequence.

19. A server in a network, wherein the network comprises at least one access point, at least one network equipment, and the server, wherein the at least one network equipment is connected to the server through the at least one access point, and wherein the server comprises:

a network interface, transmitting and receiving packets for the server; and a processor, coupled to the network interface, and configured for:

receiving at least one transmission parameter of a plurality of periodic packets from the at least one network equipment;

determining at least one time sequence for rearranging and transmitting the periodic packets according to the at least one transmission parameter;

transmitting the at least one time sequence to the at least one network equipment, and receiving the periodic packets already rearranged and transmitted from the at least one network equipment according to the at least one time sequence, wherein the periodic packets are already merged according to the at least one time sequence to generate at least one combined packet, each of the at least one combined packet comprises payload data of multiple said periodic packets; and dissembling the at least one combined packet to restore the merged periodic packets.

20. The server of claim 19, wherein the processor calculates an equipment amount Gmax and a group amount Gsize according to a device total and a hardware resource of the at least one network equipment, the processor selects a Gsize number of the at least one network equipment according to a first distance between each of the at least one network equipment and each of the at least one access point to serve as a Gsize number of gateways of the network, each of the gateways is corresponding to a group, the processor adds each of the at least one network equipment into the group corresponding to one of the gateways according to a second distance between each of the at least one network equipment and each of the gateways, the gateways receive the at least one time sequence and rearrange and transmit the periodic packets according to the at least one time sequence.

21. The server of claim 20, wherein the processor sorts the at least one network equipments according to the first distance, and selects the Gsize number of the network equipments having the smallest first distance to serve as the Gsize number of the gateways, wherein for each of the at least one network equipment, the processor adds the network equipment into the group corresponding to the gateway having the smallest second distance to the network equipment among the groups whose amounts of the contained network equipments are less than Gmax.

22. The server of claim 20, wherein when the at least one transmission parameter changes or when the network adds or removes network equipment, the processor reselects the gateways, rearranges the groups, redetermines the at least one time sequence, and retransmits the at least one time sequence.

23. The server of claim 19, wherein the processor performs time synchronization with the at least one network equipment to punctually set the at least one time sequence.

24. The server of claim 19, wherein the at least one transmission parameter comprises periods, an amount and priority levels of the periodic packets.

25. The server of claim 24, wherein the processor calculates a least common multiple of the periods of the periodic packets to serve as a transmission period of the time sequence, the processor divides the transmission period into a plurality of time slots, and in the time slots the processor performs an average distribution and a sorting of the periodic packets, and the processor performs the sorting according to the priority levels of the periodic packets.

26. The server of claim 25, wherein in the time slots the processor performs an average distribution and a sorting of the at least one combined packet and the periodic packets not merged, the processor performs the sorting according to the priority levels of the periodic packets, wherein if an empty time slot still exists in the time sequence after the average distribution and the sorting are performed, the processor disassembles the at least one combined packet and arranges a sub packet generated by disassembling the at least one combined packet into the empty time slot.

27. The server of claim 26, wherein the processor calculates a merge count M according to the periods of the periodic packets and an amount of the time slots, and the processor performs a two-packet merging for M times according to the periodic packets to generate the at least one combined packet, wherein each packet merged in each said merging is one of the periodic packets or the combined packet generated in the previous merging.

28. The server of claim 27, wherein the merge count M is an amount of the periodic packets unable to be arranged into the time slots under an assumption that each of the time slots is capable of containing one of the periodic packets.

29. The server of claim 27, wherein each said merging first merges the packets that went through fewest times of the merging, and the packets being merged have the same period.

30. The server of claim 26, wherein among the at least one combined packet, the processor disassembles the combined packet having the period greater than or equal to a period of the empty time slot to generate the sub packet.

31. The server of claim 26, wherein the processor disassembles the at least one combined packet in a descending order of times of the merging that each said combined packet went through to generate the sub packet.

32. A network equipment in a network wherein the network comprises at least one access point, the network equipment, and a server, wherein the network equipment is connected to the server through the at least one access point and comprises:

a network interface, transmitting and receiving packets for the network equipment; and a processor, coupled to the network interface, receiving a time sequence determined by the server according to at least one transmission parameter of a plurality of periodic packets, receiving the periodic packets, and rearranging and transmitting the periodic packets to the server according to the time sequence, wherein the periodic packets are already merged according to the at least one time sequence to generate at least one combined packet, each of the at least one combined packet comprises payload data of multiple said periodic packets, and wherein the server disassembles the at least one combined packet to restore the merged periodic packets.

33. The network equipment of claim 32, wherein the at least one transmission parameter comprises periods, an amount and priority levels of the periodic packets.

34. The network equipment of claim 32, wherein the processor merges and arranges the periodic packets in a plurality of time slots of the time sequence according to a rule of the time sequence, and the processor transmits the periodic packets according to an order of the periodic packets in the time slots.

35. The network equipment of claim 34, wherein the processor performs a merging according to the periodic packets and the rule of the time sequence to generate at least one combined packet, and the processor arranges the at least one combined packet into the time slots.

36. The network equipment of claim 32, wherein the processor perforins time synchronization with the at least one network equipment and the server in order to punctually transmit the periodic packets according to the time sequence.

* * * * *